(12) United States Patent
Spiegel et al.

(10) Patent No.: US 6,866,031 B2
(45) Date of Patent: Mar. 15, 2005

(54) DIRECT INJECTION INTERNAL COMBUSTION ENGINE

(75) Inventors: Leo Spiegel, Valhingen/Enz (DE); Günter Söhlke, Gifhom (DE); Gerrit Suck, Lehrte (DE)

(73) Assignee: Volkswagen, AG, Wolfsburg (DE)

( * ) Notice: Subject to any disclaimer, the term of this patent is extended or adjusted under 35 U.S.C. 154(b) by 0 days.

(21) Appl. No.: 10/474,158

(22) PCT Filed: Mar. 8, 2002

(86) PCT No.: PCT/EP02/02563

§ 371 (c)(1),
(2), (4) Date: Nov. 28, 2003

(87) PCT Pub. No.: WO02/081874

PCT Pub. Date: Oct. 17, 2002

(65) Prior Publication Data

US 2004/0112327 A1 Jun. 17, 2004

(30) Foreign Application Priority Data

Apr. 7, 2001 (DE) .......................... 101 17 513

(51) Int. Cl.$^7$ ................................................ F02B 75/08
(52) U.S. Cl. ...................... 123/668; 123/669; 123/188.1
(58) Field of Search ................................. 123/669, 668, 123/670, 188.1, 188.11, 188.3, 193.5

(56) References Cited

U.S. PATENT DOCUMENTS

| | | | | |
|---|---|---|---|---|
| 4,905,658 A | * | 3/1990 | Pfefferle | ...................... 123/670 |
| 5,339,629 A | * | 8/1994 | Winberg et al. | .............. 60/299 |
| 6,629,516 B1 | * | 10/2003 | Minemi et al. | .......... 123/193.5 |

* cited by examiner

Primary Examiner—John T. Kwon
(74) Attorney, Agent, or Firm—Ostrolenk, Faber, Gerb & Soffen, LLP

(57) ABSTRACT

An internal combustion engine, especially an Otto engine, with intake valves and with a fuel injector, which is arranged and designed so that it injects the fuel directly into a combustion chamber of working cylinders of the internal combustion engine. At least in the region of the neck, the intake valves have a surface that is designed to counteract the formation of carbon deposits.

12 Claims, 12 Drawing Sheets

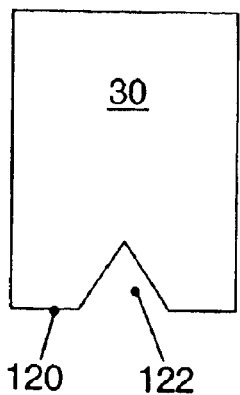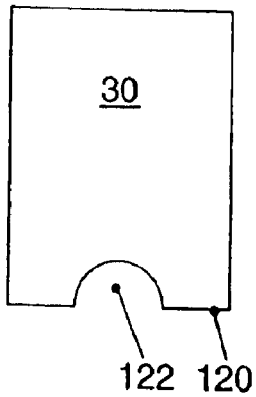
FIG. 9  FIG. 10
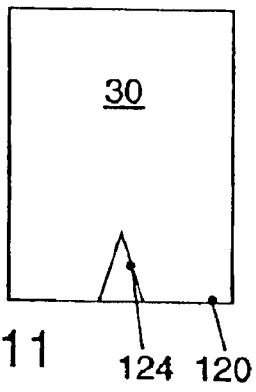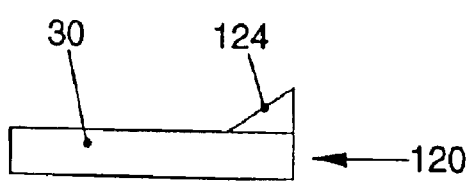
FIG. 11  FIG. 12
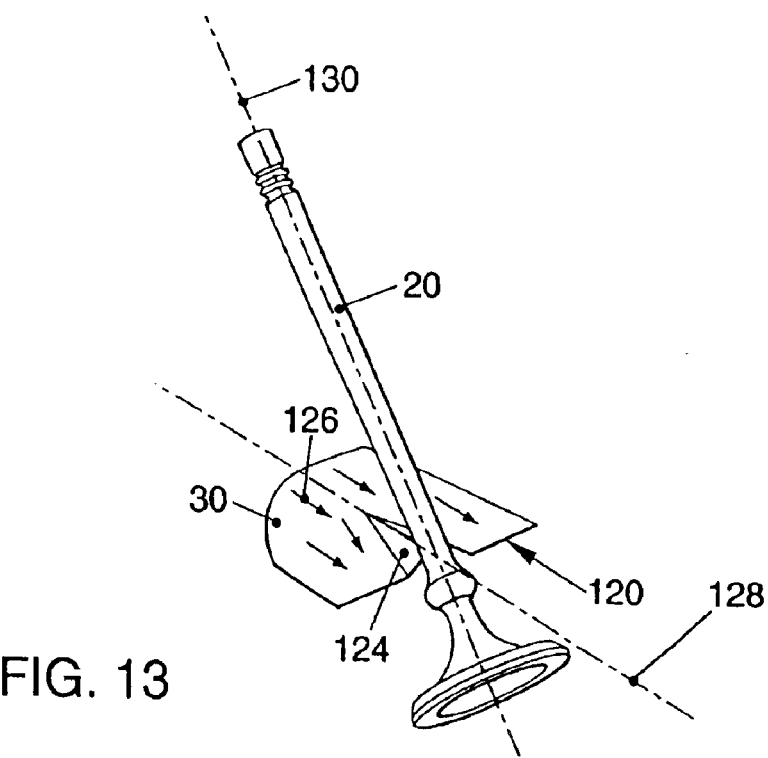
FIG. 13

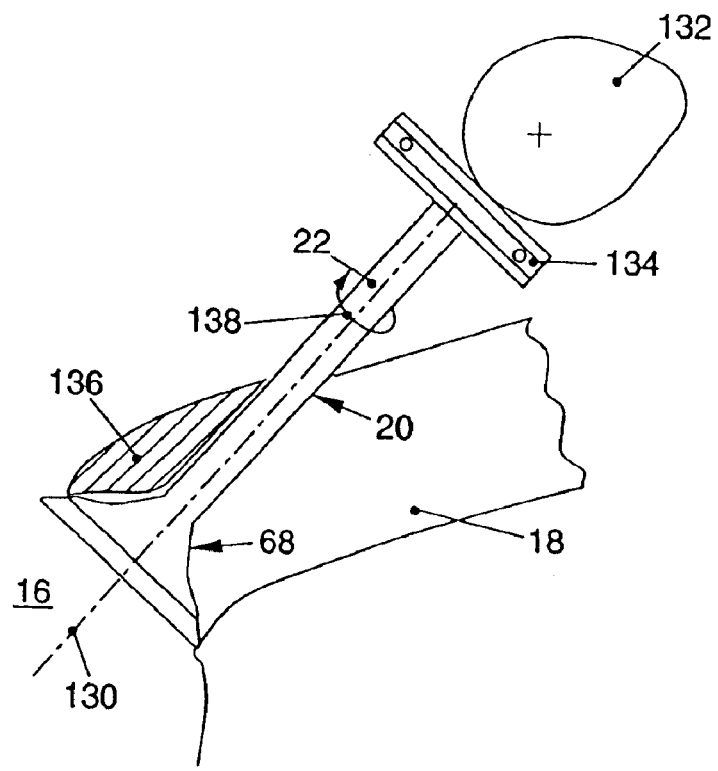
FIG. 14a
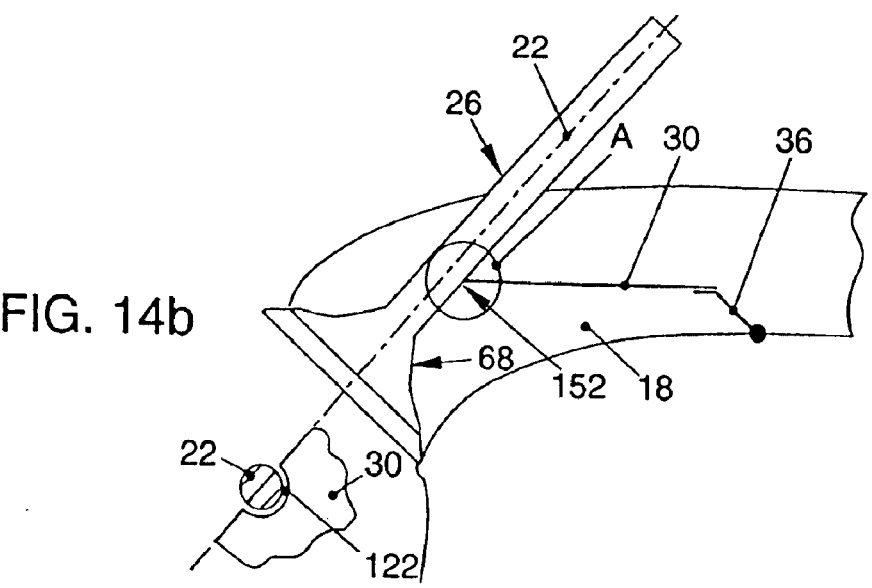
FIG. 14b
FIG. 14c

| Cylinder 1 | | Cylinder 2 | | Cylinder 3 | | Cylinder 4 Platinum coated | |
|---|---|---|---|---|---|---|---|
| Fouled | New | Fouled | New | Fouled | New | Fouled | New |
| Valve 1 | Valve 2 | Valve 3 | Valve 4 | Valve 5 | Valve 6 | Valve 7 | Valve 8 |
| 38.80 | 37.69 | 38.39 | 38.30 | 38.53 | 38.85 | 38.12 | 37.69 |
| 37.97 | 37.71 | 37.89 | 38.34 | 37.97 | 38.62 | 38.01 | 37.54 |
| 37.85 | | 37.78 | | 37.85 | | 37.89 | 37.45 |

DIRECT INJECTION INTERNAL COMBUSTION ENGINE

This application is a U.S. National stage of PCT/EP02/02563 filed Mar. 8, 2002 and claims priority from German Application No. 101 17 513.2, filed Apr. 7, 2001.

BACKGROUND OF THE INVENTION

The invention concerns an internal combustion engine, especially an Otto engine, with a fuel injector.

Gasoline engines with direct injection of the fuel into the combustion chamber, i.e., not into the intake port, suffer especially from the problem of the formation of carbon deposits on components. Carbon deposits form especially in the neck region of intake valves. A more exact analysis of how these carbon deposits form leads to the following result: Oil and fuel constituents first form a sticky coating on the components. These constituents are chiefly long-chain and branched-chain hydrocarbons, i.e., the low-volatility components of oil and fuel. Aromatic compounds adhere especially well. This sticky base coating serves as a base for the deposition of soot particles. This results in a porous surface, in which oil and fuel particles in turn become embedded. This process is a circular process, by which the coating thickness of the carbon deposits continuously increases. Especially in the area of the intake valves, the deposits originate from blowby gases and from internal and external exhaust gas recirculation, and in this process, the blowby gases and the recirculated exhaust gas come into direct contact with the intake valve.

Especially in the area of the neck of the intake valves, excessive carbon deposits have extremely negative effects for the following reasons: In the case of Otto direct injectors, the successful ignition of the stratified charge depends to a great extent on correct development of the internal cylinder flow, which ensures reliable transport of the injected fuel to the spark plug to guarantee reliable ignition at the spark plug. However, a coating of carbon deposits in the neck region of the intake valve may interfere so strongly with the tumble flow that ignition failures may occur there as a result. Under certain circumstances, however, ignition failures can lead to irreversible damage of a catalytic converter installed in the exhaust gas tract for purifying the exhaust gas. Furthermore, the coating of carbon deposits in the neck region of the intake valve causes flow resistance, which can lead to significant performance losses due to insufficient cylinder filling, especially in the upper load and speed range of the internal combustion engine. In addition, the carbon deposits in the neck region of the intake valve may prevent correct valve closing, which leads to compression losses and thus sporadic ignition failures. This in turn could irreversibly damage the catalytic converter. There is the potential for small particles to break away from the coating of carbon deposits in the neck region of the intake valve and get into the catalytic converter. These hot particles may then cause secondary reactions and corresponding local damage of the catalytic converter. For example, a hole may be burned in the structure of the catalytic converter.

Globular deposits are found especially on the valve stem downstream from a partition plate in the intake port. Due to the dripping of high-boiling hydrocarbons from the partition plate towards the valve neck or valve stem, globular carbon deposits eventually form there by the sequence of events explained above. These deposits on the valve stem can result in flow deficits due to undesired swirling and turbulent flow around the globular carbon deposits. This may persistently interfere with the formation of stable tumble flow from cycle to cycle.

A possible solution would be to keep these sources of deposits away, for example, from the intake valve, by completely eliminating exhaust gas recirculation and the introduction of blowby gases into the intake port. However, with the combustion behavior of modern reciprocating internal combustion engines, at least external exhaust gas recirculation and the introduction of blowby gases into the intake port are absolutely necessary for reasons of emission control and fuel consumption, so that this approach is not possible.

U.S. Pat. No. 4,809,662 describes the controlling of spark advance to increase combustion chamber temperatures so as to clean off the deposits.

EP 0 785 350 A2 describes a cooling measure for a discharge orifice of a fuel injector to prevent deposits on the injection orifice. Similarly, it is known from DE 197 47 268 A1 that a nozzle body of the injection nozzle can be cooled by injecting supplementary liquid so as to counteract carbon deposits in the nozzle bore.

EP 0 798 560 A1 describes keeping some fuel on a nozzle holder surface to prevent deposits on the injection nozzle.

DE 197 56 119 A1 deals with a means of preventing carbon deposits on the spark plug. To this end, a control unit is used to terminate the injection of fuel before the fuel is ignited. This is intended to prevent carbon deposits from forming on the spark plug, especially during starting of the internal combustion engine. DE 199 11 023 A1 describes a method for preventing the formation of carbon deposits on the spark plug, by injecting the fuel in a conical spray to avoid wetting the spark plug with fuel. U.S. Pat. No. 5,913,302 describes a cleaning strategy for a spark plug in an internal combustion engine with a two-stroke cycle. To this end, the ignition coil dwell time is raised for a short period of time to clean carbon deposits on the spark plug.

U.S. Pat. No. 4,703,734 describes valve overlapping and sequential opening of intake valves for operation at low speeds and for operation at high speeds to prevent the formation of carbon deposits.

DE 31 33 223 A1 describes an internal combustion engine, in which combustion chamber and intake manifold walls that come into contact with the fuel-air mixture to be ignited or with combustion gases are coated with a material of a type such that the temperatures that develop on these coated walls during operation of the internal combustion engine are high enough to prevent the formation of deposits. At the same time, however, the heat capacity is kept sufficiently low that the coated walls do not significantly increase the temperatures of fuel-air mixtures entering during the intake and compression cycles.

EP 00 48 333 A1 provides an intake valve with a shield in the region of the valve neck to counteract the formation of carbon deposits by lowering the surface temperature.

DE 199 45 813 A1 describes a method of operating an internal combustion engine, in which systematic measures for cleaning the combustion chamber are initiated when deposits are detected in the combustion chamber. For example, knocking combustion is induced and/or a cleaning liquid is added to the combustion air intake.

SUMMARY OF THE INVENTION

To this end, the invention provides that, in an internal combustion engine of the type described above, a surface of at least the neck region of the intake valve is designed as a catalytic surface in such a way that it counteracts the information of carbon deposits.

This has the advantage that the formation of carbon deposits on the intake valves, which could impair the operational reliability and the operating behavior of the internal combustion engine, is effectively prevented.

Carbon deposits are prevented by designing the surface to be microporous or antiadhesive and to consist, for example, of Cr—C—N in a coating thickness of especially 5 μm. The mechanism of action here is a suitable surface tension that counteracts carbon deposits.

To prevent the accumulation of carbon deposits, the surface is designed to be chemically inert towards predetermined elements, especially towards C, H, O, and/or N, and consists, for example, of TiZr—C—H—N—O or TiAl—C—H—N—O, for example, in a coating thickness of 5 μm. The mechanism of action here is saturation of the surface with certain elements, which then are not deposited.

To remove carbon deposits, the catalytic surface consists, for example, of Pt or vanadium nitride (VN). It is especially advantageous to provide an oxidized coating of, for example, vanadium pentoxide. An especially good catalytic effect due to a large surface area is achieved by making the surface microrough.

Additional features, advantages and advantageous refinements of the invention are specified in the dependent claims and are described below with reference to the examples of embodiments of the invention illustrated in the drawings.

BRIEF DESCRIPTION OF THE DRAWINGS

FIG. 9 shows a first preferred embodiment of a partition plate for the intake port in a top view.

FIG. 10 shows a second preferred embodiment of a partition plate for the intake port in a top view.

FIG. 11 shows a third preferred embodiment of a partition plate for the intake port in a top view.

FIG. 12 shows the partition plate of FIG. 11 in a side view.

FIG. 13 is a schematic and perspective representation of the flow diversion by the partition plate of FIGS. 11 and 12.

FIG. 14a shows a preferred embodiment of a wiping device with valve rotator in a schematic sectional view.

FIG. 14b shows a preferred embodiment of a partition plate, which is designed as a wiper, in a schematic sectional view.

FIG. 14c shows a detailed view of area A in FIG. 14b in a schematic cross section.

DETAILED DESCRIPTION OF THE PREFERRED EMBODIMENTS

Figure 1:
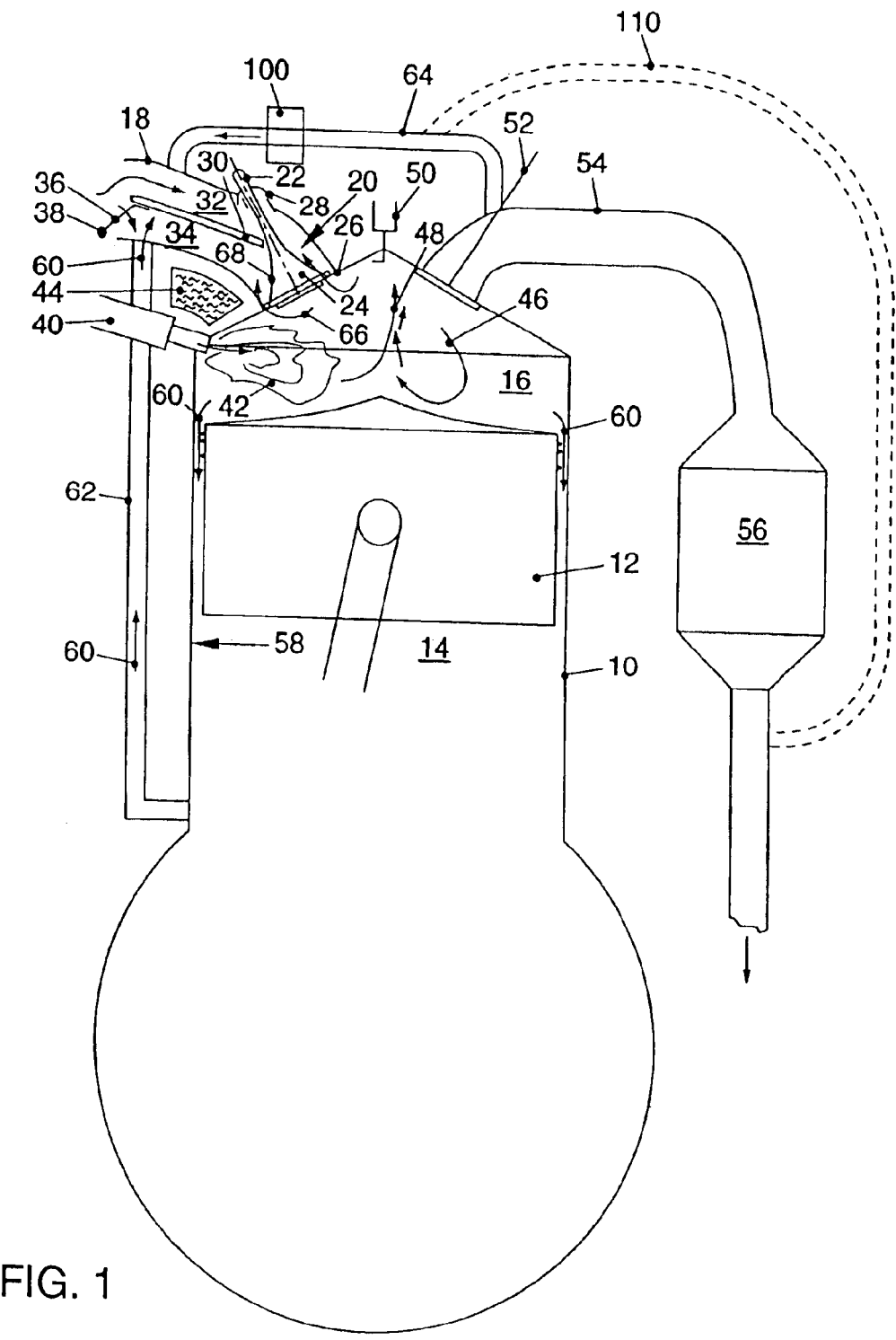
FIG. 1 shows a preferred embodiment of an internal combustion engine in a schematic sectional view.

The internal combustion engine shown schematically in FIG. 1 in the form of an Otto engine comprises a crankcase 10, in which a piston 12 moves up and down in a working cylinder 14, such that work is performed in a well-known way by a thermodynamic cycle, and the reciprocating motion of the piston 12 is transmitted as rotational motion to a crankshaft, which is not shown. The piston separates a combustion chamber 16. Fresh air is supplied to the combustion chamber 16 through an intake port 18. An intake valve 20 selectively opens or closes a connection between the combustion chamber 16 and the intake port 18. The intake valve 20 comprises a valve stem 22 and a valve head 24. The valve head 24 gives a tight seal on a seat ring 26 when the valve is closed. In addition, the intake valve 20 is guided by a valve stem guide 28. The combination of the intake valve 20, the intake valve seat 26, the valve stem guide 28, and possibly other components in the area of the intake valve 20, which are functionally part of the intake valve 20, will be referred to as the intake valve unit. The intake valve 20 is operated by a suitable cam on a camshaft, which is not shown in FIG. 1. The inlet or intake port 18 is divided by a partition plate 30 into an upper port 32 and a lower port 34. In addition, a charge movement butterfly valve 36 is provided, which can be rotated about an axis 38 into an open position and a closed position. In the closed position (as shown here), the charge movement butterfly valve 36 closes the lower port 34. An injector 40 for fuel 42 is arranged in such a way that it injects the fuel 42 directly into the combustion chamber 16. The internal combustion engine shown here is thus an Otto engine with direct injection. A cooling water channel 44 for removing heat is formed in the cylinder head adjacent to the intake valve 20 and the injector 40. The intake port 18 with the partition plate 30 and the intake valve 20 is designed in such a way that tumble flow develops (as indicated by arrow 46), when air flows from the intake port 18 into the combustion chamber 16. Together with the injection direction of the fuel (arrow 48), an ignitable fuel-air mixture is transported to a spark plug 50 in a compression cycle. The spark plug 50 ignites the fuel-air mixture, and work is performed by the piston 12. The resulting exhaust gas is then removed through an exhaust valve 52, an exhaust port 54, and a precatalytic converter 56. During normal operation of the internal combustion engine, the charge movement butterfly valve 36 closes the lower port 34 at low speeds to ensure sufficient tumble flow 46.

Due to unavoidable leakage between the piston 12 and a wall 58 of the working cylinder 14 during operation of the internal combustion engine, gas 60 flows from the combustion chamber 16, past the piston 12 and into the cylinder crankcase 10. To remove this so-called blowby gas 60, a crankcase breather pipe 62 is provided, which returns the blowby gas 60 to the combustion chamber via the intake port 18. Due to the hydrocarbon load of the blowby gas 60, it may not be released directly into the environment.

Furthermore, to reduce pollutant emissions of the internal combustion engine with the exhaust gas, a device 64 for external exhaust gas recirculation (EEGR) is provided. This device takes exhaust gas from the exhaust port 54 and feeds it to the intake port 18. In addition, so-called internal exhaust gas recirculation is realized by closing the exhaust valve 52 and opening the intake valve 20 while the exhaust cycle is still in progress, so that a portion of the exhaust gas from the last cycle is forced into the intake port 18 (arrow 66) instead of being discharged into the exhaust port 54 and is then drawn back into the combustion chamber 16 during the next intake cycle.

The intake valve 20 thus comes into contact only with filtered clean air, but also with blowby gases 60, the exhaust gas from internal and external exhaust gas recirculation, and with oil, which runs down on the valve stem 22. Accordingly, there is the danger that carbon deposits will form, especially in the area of the neck or tulip 68 of the intake valve 20. Since this is a direct-injection engine, the cleaning effect, due to wetting of the intake valve 20 with fuel, which occurs in conventional Otto engines with injection into the intake port, is lost here. The invention counteracts these carbon deposits by preventing the deposits in the first place or by removing deposits that do form.

Figure 2:
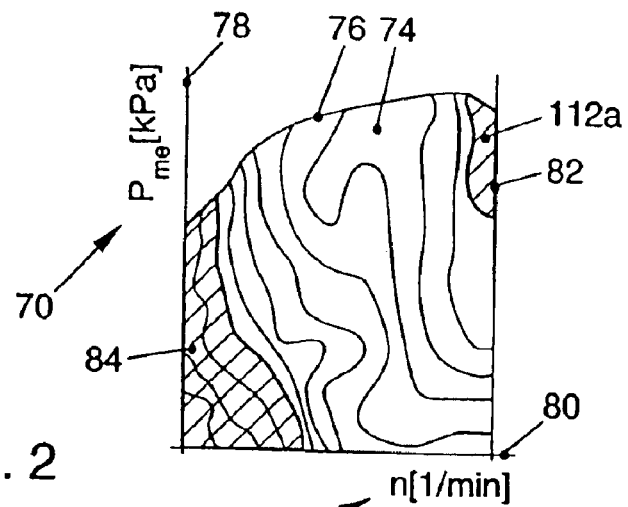
FIG. 2 is a graphic representation of a conventional temperature characteristic diagram for an intake valve.

The internal combustion engine is operated in a so-called load-speed characteristic diagram, as shown in FIG. 2, in which load 70 ($P_{me}$[kPa]) is plotted against speed 72 (n [rpm]). The area 74 enclosed by the load curve 76 and the axes 78, 80 of the coordinate system forms the characteristic diagram and can contain various parameters. In the graph in FIG. 2, this parameter is a temperature 82 for the intake valve 20. In a relatively small, shaded region 84 of the characteristic diagram, the intake valve temperature is below 180° C., or it is above 380° C. in a different region 112a of the characteristic diagram.

Figure 3:
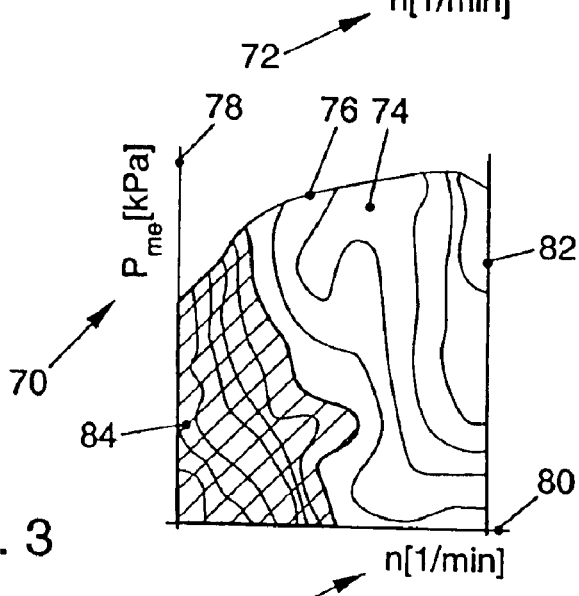
FIG. 3 is a graphic representation of a temperature characteristic diagram for an intake valve with an increased characteristic diagram region with T<180° C.

To essentially prevent a buildup of carbon deposits on the intake valves over most of the usual operating range of the internal combustion engine, the intake valves, the seat ring 26 of the intake valve seat, and/or the valve stem guide 28 are designed in such a way that low surface temperatures 82 of less than 180° C. develop at least in the area of the neck 68 of the intake valves 20 in a large region of the load characteristic diagram 74 of the internal combustion engine. This is illustrated in FIG. 3. The shaded region 84 of the characteristic diagram with intake valve temperatures below 180° C. is significantly increased by suitable measures at the intake valves 20 or at the valve stem guide 28. In other words, at least one intake valve unit is designed with heat-dissipating measures in such a way that the region of the load-speed characteristic diagram with surface temperatures below 180° C. in the region of the neck of the intake valve is increased in area relative to the corresponding region of the load-speed diagram without these heat-dissipating measures, so that a buildup of carbon deposits on the intake valve during operation of the internal combustion engine is reduced. Surprisingly, it was found that no significant carbon deposits form on the intake valves 20 at temperatures below 180° C. A significant portion of the characteristic diagram 74 is thus a region 84 in which no deposits build up. This region 84 of the characteristic diagram occurs, for example, at speeds up to 4,000 rpm, and in that speed range extends essentially to full load. In the ordinary driving operation of a motor vehicle, the internal combustion engine is operated in this region of the characteristic diagram during most of its operating time. Therefore, during most of its operating time, the internal combustion engine is in an operating state in which no carbon deposits or only very small amounts of carbon deposits form on the intake valves. For example, the intake valve unit is designed in such a way that surface temperatures of less than 180° C. develop in the area of the neck of the intake valves in at least a third of the load characteristic diagram of the internal combustion engine.

Figures 5, 7:
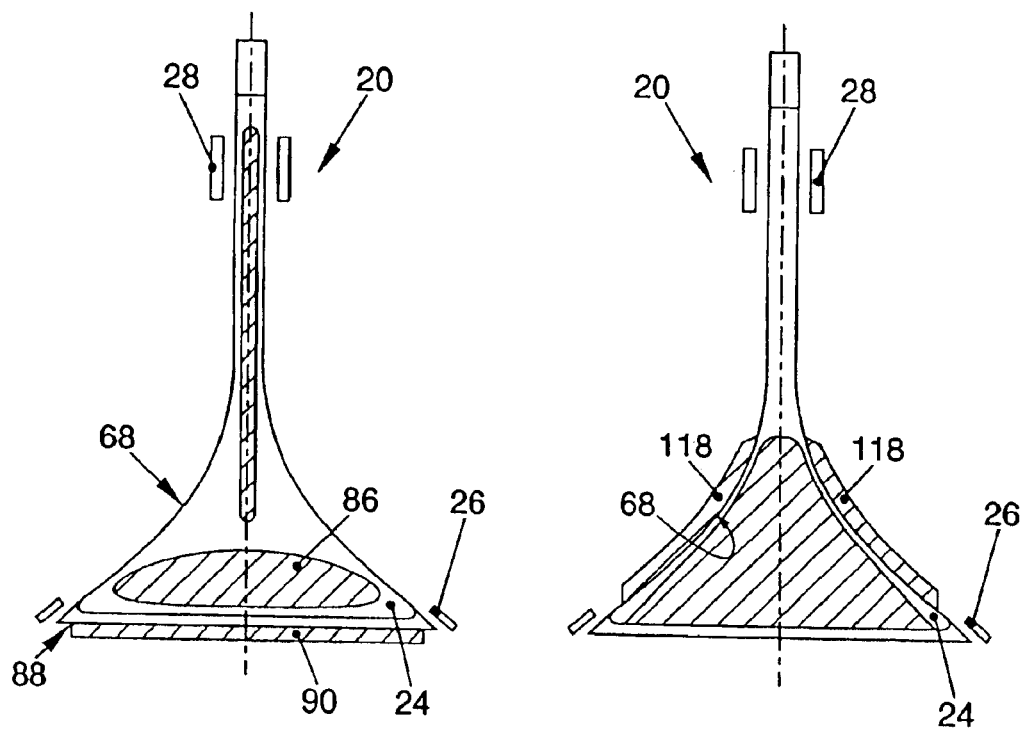
FIG. 5 shows a preferred refinement of an intake valve for the lowest possible valve temperatures in a schematic sectional view.
FIG. 7 shows another preferred refinement of an intake valve for the highest possible valve temperatures in a schematic sectional view.
Figure 6:
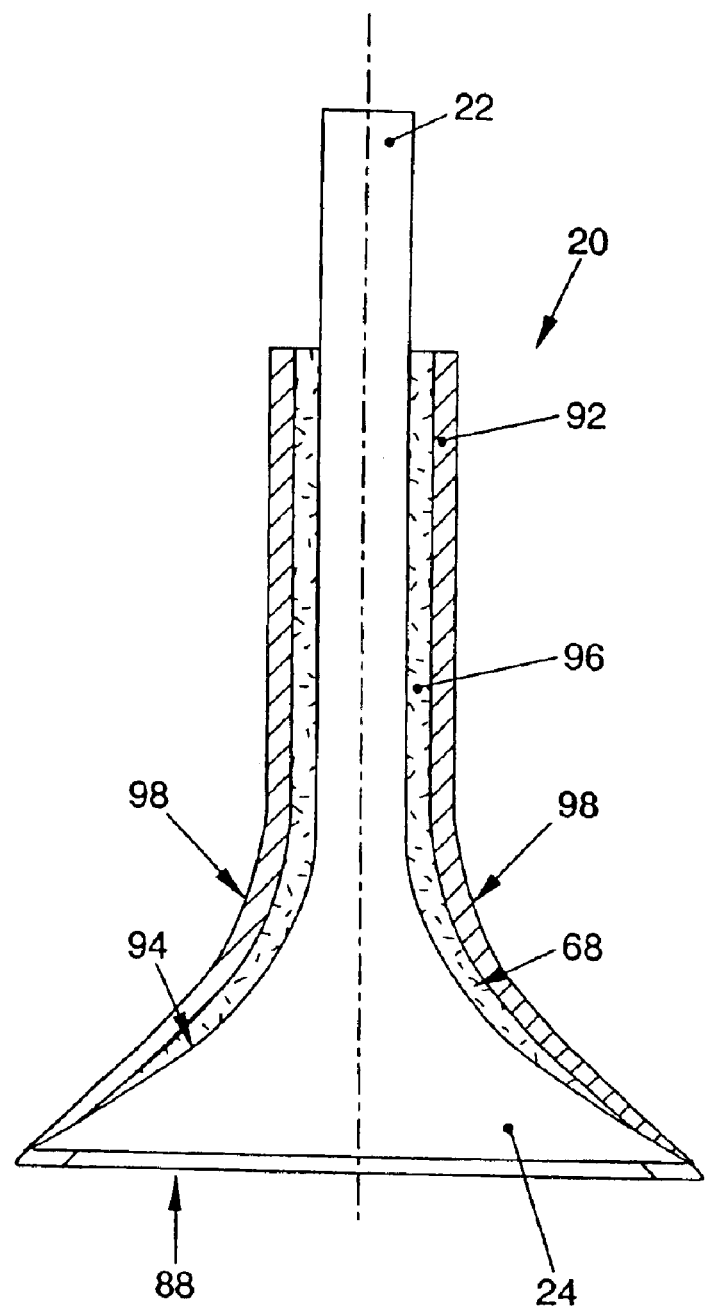
FIG. 6 shows a preferred refinement of an intake valve for the lowest possible valve temperatures in a schematic sectional view.

The following measures are used alone or in combination to obtain this type of characteristic diagram behavior: Strong heat dissipation to an enclosing cylinder head with correspondingly reduced temperature of the intake valves 20 is achieved by making the seat ring 26 from a material with high thermal conductivity. Intake valve temperatures are further reduced by making the intake valves 20 from a material with a low heat capacity and/or from a material with a low or high thermal conductivity. In addition, reduced temperatures on the surface of the intake valves 20 are achieved by designing the intake valves as hollow valves filled with Na—K 86, as shown in FIG. 5, since this results in improved heat dissipation to the seat ring 26 and to the valve stem guide 28, so that a smaller amount of heat is retained in the intake valve 20. In other words, improved cooling lowers the temperature of the intake valve 20 as a whole, including especially at the surface in the area of the neck 68, where there is the greatest danger that carbon deposits will form. The amount of heat entering the intake valves 20 from the hot combustion chamber is reduced by forming a layer of thermal insulation, especially a ceramic coating 90, in the region of the base 88 of the intake valve 20. To achieve further temperature reduction, at least one intake valve 20 is provided with a sleeve 92, as shown in FIG. 6, which covers a portion of the stem 22, the neck 68 and at least a portion of the side 94 of the valve head 24 of the intake valve 20 that faces away from the combustion chamber 16. An air gap 96 is formed between the intake valve 20 and the sleeve 92 to provide thermal insulation between the valve 20 and the sleeve 92. This results in reduced heat transfer from the valve 20 to the sleeve 92 in almost the entire load characteristic diagram of the internal combustion engine with a correspondingly low surface temperature of the sleeve surface 98 exposed to the stream of intake air of a maximum of 165° C., so that a buildup of carbon deposits is effectively prevented.

The device 64 for external exhaust gas recirculation shown in FIG. 1 is preferably connected with the exhaust port 54 behind or downstream from the precatalyst 56, as is indicated by broken lines 110. This results in a cooler air stream in the intake tract 18 of the internal combustion engine, since the recirculated exhaust gas is cooler. This leads to a corresponding reduction of the temperature of the intake valves 20, and the region of the load-speed characteristic diagram with low intake valve temperatures below 180° C. is further increased. In addition, the exhaust gas is prepurified, so that smaller amounts of components that are capable of being deposited, especially hydrocarbons, are present in the exhaust gas. Furthermore, the recirculated exhaust gas has a different composition, which, surprisingly, leads to a smaller buildup of carbon deposits. Further cooling of the intake air stream in the intake port 18 is achieved by providing the device 64 for exhaust gas recirculation with a device, which is not shown, for cooling the recirculated exhaust gas. To achieve further reduction of the amounts of components in the exhaust gas that are capable of being deposited and could possibly contribute to the buildup of carbon deposits, the device 64 for exhaust gas recirculation is also provided with a particle filter 100. Furthermore, it is advantageous to adjust an intake camshaft towards "late" in operating situations in which the carbon deposits form in larger amounts. In this way, the valve overlap of the intake and exhaust valves 20 and 52, respectively, is reduced at the exhaust stroke, and this results in a corresponding reduction of the internal exhaust gas recirculation.

To further prevent the buildup of carbon deposits on the intake valves by means of temperature reduction and to further increase the region of the load-speed characteristic diagram with intake valve temperatures below 180° C., the temperature of the cooling water can also be lowered, for example, by 10° C., during operation of the internal combustion engine in the region of the load-speed characteristic diagram with intake valve temperatures below 180° C., compared to operation outside of this region of the load-speed characteristic diagram.

Figure 4:
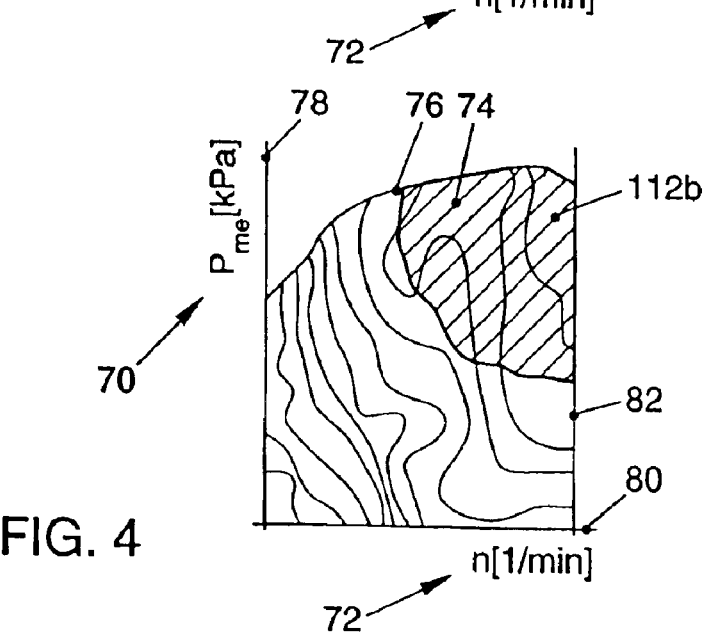
FIG. 4 is a graphic representation of a temperature characteristic diagram for an intake valve with a characteristic diagram region with T>380° C.

An additional approach for reducing the formation of carbon deposits on the intake valves 20 is to increase the intake valve temperature, at least temporarily, since, surprisingly, it was found that any carbon deposits possibly present are removed at temperatures above 380° C. To this end, the intake valve unit, which comprises, among other components, the intake valves 20 and the valve stem guide 28, is designed with means that hinder heat dissipation in such a way that increased surface temperatures of more than 380° C. develop at least in the area of the neck 68 of the intake valves 20 in at least one predetermined region of the load characteristic diagram 74 of the internal combustion engine. This is illustrated in FIG. 4. The intake valve temperature is above 380° C. in the shaded region 112b of the characteristic diagram. At these temperatures, carbon deposits on the intake valves 20 are removed. This region 112b of the characteristic diagram occurs, for example, at speeds over 3,000 rpm, and in that speed range. extends essentially to full load. Even if the internal combustion engine is not operated most of the time in the region 112b during normal driving operation of a motor vehicle, nevertheless, carbon deposits that could adversely affect the operation of the internal combustion engine cannot build up, since their removal in the shaded region 112b of the characteristic diagram occurs very quickly. For example, operation of the internal combustion engine in this region 112b of the characteristic diagram for a period of, for example, 20 min., is sufficient to remove even a thick layer of carbon deposits. In other words, a routine expressway trip cleans the intake valves 20 sufficiently. In addition, this region of the characteristic diagram can be entered in the course of maintenance or repair work on the internal combustion engine in an automotive workshop.

The following measures are used alone or in combination to obtain the characteristic diagram behavior illustrated in FIG. 4: Low heat dissipation to an enclosing cylinder head with correspondingly higher temperature of the intake valves 20 is achieved by making the seat ring 26 from a material with low thermal conductivity, especially a material with a high iron content. Further increases in the intake valve temperature are achieved by making the intake valves 20 from a material with a high heat capacity, especially Nimonic or a similar material, and/or by making them from a material with high thermal conductivity.

If the internal combustion engine is temporarily operated in the region 112b of the characteristic diagram (FIG. 4) at T>380° C. during maintenance or repair work, the predetermined time is advantageously 5 min. to 60 min., and especially 30 min. The reduction of the carbon deposits on the intake valves and the region of the load-speed characteristic diagram with intake valve temperatures above 380° C. can be increased by also increasing the temperature of the cooling water, for example, by 10° C., during operation of the internal combustion engine in this region of the load-speed characteristic diagram with the intake valve temperature above 380° C., compared to operation outside of this region of the load-speed characteristic diagram. To achieve increased removal of carbon deposits, an agent that dissolves carbon deposits is injected into the intake port 18 during operation of the internal combustion engine in the region 112b of the characteristic diagram.

In addition, a further increase in the temperatures at the surface of the intake valves 20 is achieved, as shown in FIG. 7, by designing the intake valves 20 with a hollow head with minimized wall thickness that is open towards the combustion chamber, as a result of which a larger amount of heat is conducted to the neck 68 of the intake valve. Reduced heat removal by air flowing past the intake valve 20 in the intake cycle of the internal combustion engine is achieved by providing a layer of thermal insulation 118, especially a ceramic layer, in the area of the neck 68 of the intake valves 20, or by providing a valve head 24 of the intake valves 20 with a flat design.

Figure 5A:
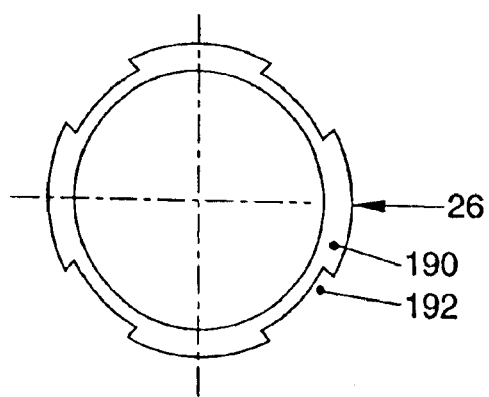
FIG. 5a shows an advantageous refinement of a valve seat ring for an internal combustion engine in accordance with the invention in top view.

FIG. 5a illustrates an example of an embodiment of a seat ring 26, which is installed in the area of the intake valve seat of the one or more intake valve units. On its side facing the cylinder head, this seat ring 26 has a surface 190 that constitutes a contact surface with corresponding heat transfer from the seat ring 26 to the cylinder head. Recesses 192 are formed in the peripheral edge of the seat ring 26, which reduce this contact surface in the recessed sections. A smaller contact surface 190 is thus present in the area of the recesses 192 than in the peripheral areas of the contact surface 190 of the seat ring 26 that do not have a recess 192. This results in correspondingly reduced heat transfer from the seat ring 26 to the cylinder head, so that the intake valve 20 associated with this seat ring 26 has a higher heat content and thus a higher temperature than an intake valve 20 with a conventional seat ring 26 without recesses 192.

To support the removal of carbon deposits already present on the intake valve, the motor oil contains at least one additive that dissolves carbon deposits, and the motor oil thus serves as a vehicle for the carbon-dissolving agent or agents. This is a supplementary use of the motor oil, which previously served only as a lubricant and possibly contained antiwear additives. To bring a sufficient amount of motor oil with carbon-dissolving additives to the site of the carbon deposits, i.e., to the neck 68 and the upper side 94 of the valve head 24 of the intake valves 20, a valve stem seal in the area of the valve stem guide 28 of the intake valves 20 is designed to be especially penetrable by motor oil. This increases the amount of motor oil running down from the cylinder head along the valve stem 22 to the neck 68 and to the valve head 24, so that the carbon-dissolving agents added to the motor oil can have their intended effect. An internal combustion engine operated with this additive-containing motor oil preferably has the following features: A valve stem seal of the intake valves 20 is designed in such a way that it has an oil penetrability of greater than 0.002 g/h. It is especially advantageous for piston ring packets of the pistons of the internal combustion engine to be designed in such a way that the amount of oil recirculated into the combustion chamber is greater than 1.5 g/h per cylinder at rated speed, and/or for an oil separator of a crankcase breather pipe to be designed in such a way that it has an oil penetrability of greater than 1 g/h. All of these measures cause more motor oil with the carbon-dissolving additive to be transported to the intake valves.

Figure 8:
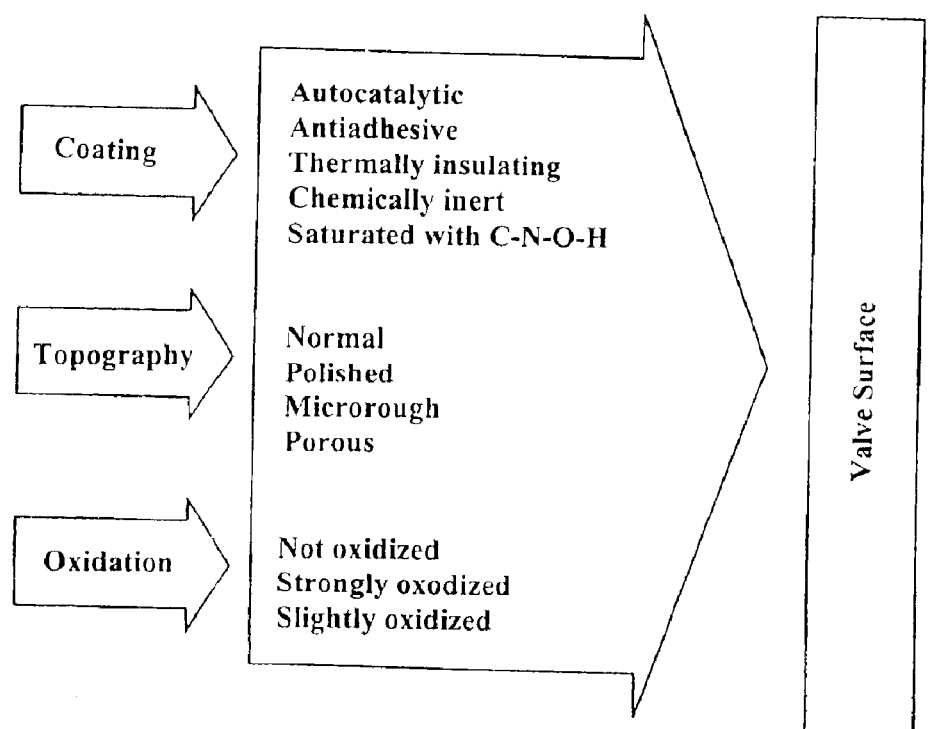
FIG. 8 is a schematic representation of various examples of valve coatings.

Another approach to preventing operationally harmful carbon deposits on the intake valves 20 concerns a special surface quality or coating at least in the area of the neck 68 of the intake valves 20 or of the entire surface of the intake valves 20, such that the surface or coating is designed to be thermally insulating, antiadhesive, chemically inert and/or catalytically active. In this regard, insulating, antiadhesive, and chemically inert surfaces or coatings are intended to prevent or at least retard the buildup of carbon deposits, whereas catalytic surfaces or coatings are intended for the removal of carbon deposits that have already formed. In regard to the latter, it is advantageous for the internal combustion engine and the catalytic surface or coating to be coordinated with each other in such a way that operating conditions in which the carbon deposits form faster than they are removed by the catalytic surface or coating do not predominate. In other words, during most of its operating time, the internal combustion engine should operate under conditions such that the catalytic surface or coating removes the carbon deposits faster than they form. An effect that supports the mechanism of action of the special surface or coating of the intake valves is additionally achieved by special surface topographies, which are formed at least in those regions of the surface of the intake valve 20 that are especially susceptible to carbon deposits, for example, in the region of the neck 68. In this regard, especially a polished surface helps to prevent the buildup of carbon deposits. A microrough surface structure, on the other hand, has a large surface area and thus supports the action of a catalytic surface or coating. A specific state of oxidation of the coating or surface of the intake valves may also be advantageous. FIG. 8 schematically illustrates various coatings and their corresponding effects.

The surface is formed, for example, as a thermally insulating coating, especially a ceramic coating, for example, $ZrO_2$, especially with a coating thickness of 80 $\mu$m. Reduced heat removal by air flowing past the intake valve in the intake cycle of the internal combustion engine is achieved by forming the thermally insulating coating in the region of the neck of the intake valves. The resulting higher surface temperatures of the intake valve remove any carbon deposits that have already formed during the operation of the internal combustion engine. The amount of heat entering the intake valves from the hot combustion chamber is reduced by forming the thermally insulating coating in the region of a valve base of the intake valves. The resulting low surface temperatures of the intake valve counteract the buildup of carbon deposits. Carbon deposits are prevented by designing the surface to be microporous or antiadhesive and to consist, for example, of Cr—C—N in a coating thickness of especially 5 $\mu$m. The mechanism of action here is a suitable surface tension that counteracts carbon deposits. To prevent the accumulation of carbon deposits, the surface is designed to be chemically inert towards predetermined elements, especially towards C, H, O and/or N, and consists, for example, of TiZr—C—H—N—O or TiAl—C—H—N—O, for example, in a coating thickness of 5 $\mu$m. The mechanism of action here is saturation of the surface with certain elements, which then are not deposited. To remove carbon deposits, the surface is designed to be catalytic or autocatalytic and consists, for example, of Pt or vanadium nitride (VN). It is especially advantageous to provide an oxidized coating of, for example, vanadium pentoxide. An especially good catalytic effect due to a large surface area is achieved by making the surface microrough.

Another measure for preventing the buildup especially of nodular carbon deposits on the valve stem 22 of the intake valve 20 downstream from the partition plate 30 concerns the use of the partition plate 30 to divert the fluid stream in the intake port 18 to prevent it from striking the valve stem 22. For this purpose, an end of the partition plate 30 facing the intake valve 20 is designed in such a way that fluid flow in the intake port 18 is guided past the valve stem 22 of the intake valve 20. This effectively prevents dripping or deposition of liquids or particles in the fluid stream on the valve stem 22, so that no carbon deposits build up on the valve stem 22. Various embodiments of the partition plate 30 are shown in FIGS. 9 to 12. For example, a triangular recess 122 (FIG. 9) or a semicircular recess 122 (FIG. 10) is formed on the end 120 of the partition plate 30 that faces the intake valve 20. Any drops of liquid possibly present on the plate first move along the edges of the recess 122 under the influence of the flow in the intake port 18 and then become detached from the partition plate 30. These drops entrained by the flow then fly past the valve stem 22 without coming into contact with it. Alternatively, a wedge-shaped punched piece 124 is arranged on this same end 120 of the partition plate 30 and forms a projection that suitably diverts the flow in the intake port 18, as is shown in FIGS. 11 and 12. FIG. 13 illustrates the diversion of the flow 126 by the design of the partition plate 30. In addition to avoidance of undesired turbulence of the flow in the intake port 18 downstream from the partition plate 30, the above designs of the partition plate 30 provide positive air distribution, which improves the stability of the combustion behavior of the direct-injection Otto engine. Diversion of the intake air around the intake valve 20 results in increased tumble intensity at the same flow rate.

At its end facing the intake valve 20, the partition plate 30 thus has a recess 122 or punched piece 124, which is arranged against the direction of flow upstream from the valve stem 22 on a line 128 that is parallel to the fluid flow 126 and intersects the center axis 130 of the valve stem 22. This causes liquids (oil condensate) that are being deposited on the partition plate 30 to be guided along the edge of this recess 122 or punched piece 124 and to fly past the valve stem 22 after they become detached from the partition plate 30. On its end 120 facing the intake valve 20, the partition plate 30 shown in FIGS. 11 to 13 has a projection 124, which is arranged against the direction of flow upstream from the valve stem 22 on a line 128 that is parallel to the fluid flow 126 and intersects the center axis 130 of the valve stem 22. This causes the fluid flow 126 to be guided around the valve stem 22, so that neither liquids coming off the partition plate 30 nor particles entrained in the fluid flow 126 strike the valve stem 22. This effectively prevents carbon deposits from forming on the valve stem 22. The projection 124 has, for example, a triangular or wedge-like design. If, nevertheless, deposits form on the valve stem 22, they can be scraped off in an advantageous way by arranging the partition plate 30 at such a distance upstream from the valve stem 22 that the end 120 of the partition plate 30 that faces the intake valve 20 comes into mechanical contact with deposits forming on the valve stem 22 (see FIGS. 14b and 14c).

FIG. 14a illustrates another measure for removing carbon deposits from the intake valve 20. As shown in the drawing, a cam 132 of the intake camshaft acts on the intake valve 20 via a valve rotator 134. The valve rotator is given only as an example; an arrangement without this valve rotator 134 is also possible. Alternatively, for example, instead of the valve rotator 134, a roller drag lever/cup tappet arrangement that is eccentric to the valve stem 22 is provided, which likewise produces rotation of the intake valve 20 about its longitudinal axis 130. In the intake port 18, adjacent to the intake valve 20, a wiping device 136 is provided, which is designed in such a way and arranged at such a distance from the intake valve 20 that deposits on the intake valve 20 come into mechanical contact with the wiping device 136. The rotation 138 of the intake valve 20 causes deposits on the surface of the neck 68 and the valve stem 22 to be removed by the wiping device 136, so that no carbon deposits that could impair the operation of the internal combustion engine are able to accumulate on the intake valves 20. The wiping device 136 has a contour that is congruent with the intake valve 20 and is formed, for example, as a plate cast in the cylinder head, which has only a slight effect on the fluid dynamics in the intake port 18. The wiping device 136 follows the valve contour as closely as possible in the area of the neck 68 and the stem 22.

An alternative embodiment of the wiping device is shown in FIGS. 14b and 14c. Here the partition plate 30 is placed so close to the valve stem 22 that the wiping device 136 is formed as a single piece with it or that the partition plate itself forms the wiping device 136, in that the partition plate 30 is arranged at such a distance upstream of the intake valve 20 that the end 120 of the partition plate 30 that faces the intake valve 20 comes into mechanical contact with deposits forming on the intake valve 20. Deposits on the surface of the valve stem 22 are scraped off by the valve-side end 120 of the partition plate 30 by the movement of the intake valve 20 (lifting and rotational movement), so that no carbon deposits that could impair the operation of the internal combustion engine are able to form on the intake valves 20. As is apparent from the detail drawing in FIG. 14c, the partition plate 30 with the recess 122 is placed close to the valve shaft 22, so that the recess 122 partially encompasses the valve stem 22. This makes it possible for carbon deposits to be wiped off around a larger peripheral segment of the valve stem 22. In addition, a wiping edge 152 is formed on the partition plate 30 on the end 120 facing the valve stem. For example, the distance between the end 120 of the partition plate 30 and the intake valve is 0.1 to 0.5 mm, and especially 0.2 mm or 0.15 mm. A wiping edge 152 is formed on the end 120 of the partition plate 30 facing the valve stem for the effective removal of carbon deposits on the intake valve 20.

Figure 14E:
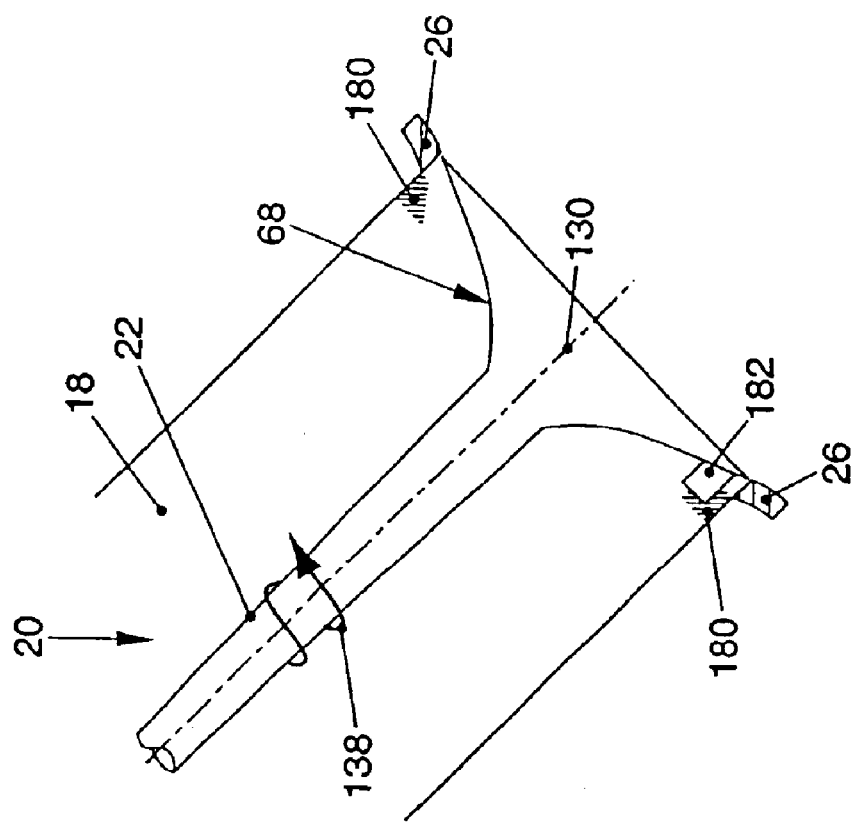
FIG. 14e is an illustration of the valve rotation with carbon deposits in the area of the seat ring.
Figure 14D:
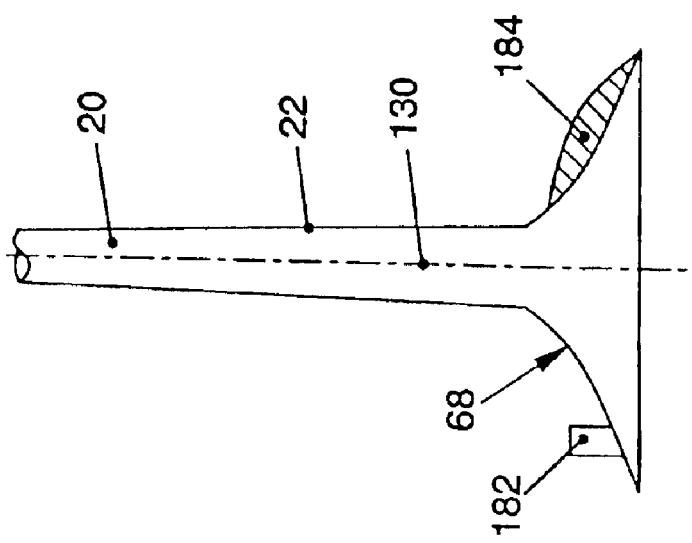
FIG. 14d shows an alternative embodiment of a wiping device in a schematic sectional view.
Figure 14F:
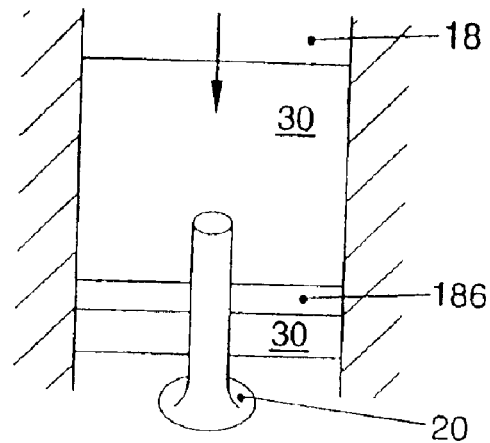
FIG. 14f shows another preferred embodiment of a wiping device in a top view.
Figure 14G:
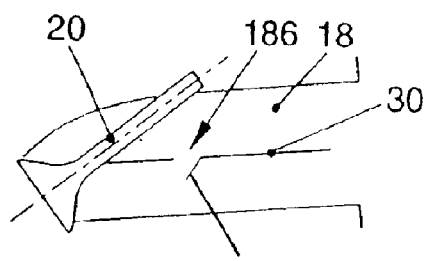
FIG. 14g shows the wiping device of FIG. 14f in a schematic sectional view.
Figure 14H:
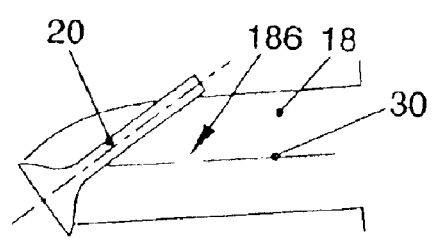
FIG. 14h shows an alternative embodiment of the wiping device of FIGS. 14f and 14g in a schematic sectional view.

A refinement of the partition plate 30, for example, the partition plate with an integrated wiping edge or the partition plate with a device for guiding the fluid flow past the valve stem 22, is shown in FIGS. 14f to 14h. As is apparent from FIGS. 14f and 14g, the partition plate 30 has a slot 186, which runs perpendicularly to the longitudinal axis of the partition plate 30 across the entire width of the partition plate 30 and is, for example, 2 mm to 3 mm wide. This makes it possible for residues present on the partition plate 30, such as oil, fuel, etc., to drain to the bottom of the intake port 18 and thus to flow off more easily into the combustion chamber when the intake valve 20 is opened. For example, the drain slot 186 is provided with a turned-down edge 188, as FIG. 14g shows. However, it is not necessary to provide this turned-down edge, as FIG. 14h shows.

Extensive testing that was recently conducted shows that deposits in the area of the valve seat ring 26 of the intake valve 20 are also responsible in a surprising way for the phenomena described at the beginning. A "carbon deposit lip" 180 forms in the area of the seat ring 26, as FIG. 14e shows. The mechanics of a valve train of modern internal combustion engines are designed in such a way that more or less rapid autorotation of the intake valves 20 (arrow 138 in FIGS. 14a and 14e) occurs above a certain engine speed, i.e., the intake valve 20 performs a translational movement along the longitudinal axis 130 of the valve and a rotational movement about the longitudinal axis 130 of the valve during opening and closing. In accordance with the invention, a device is mounted on the tulip 68 of the intake valve 20, which is arranged and designed in such a way that a wiping mechanism between the valve tulip 68 and seat ring 26 arises from the autorotation of the valve 20, so that accumulations of combustion residues are prevented in the critical area of the valve seat ring 26. A first variant is shown in FIGS. 14d and 14e and comprises a pin or post 182, which is mounted on the valve tulip 68 adjacent to the seat ring 26. FIG. 14e illustrates how this pin or post 182 sweeps over a predetermined area of possible deposits and thus scrapes away deposits. In an alternative embodiment shown in FIG. 14d, a plate 184 is mounted on the valve tulip 68. The devices 182 and 184 for wiping off deposits in the area of the seat ring 26 are attached to the tulip 68 of the intake valve 20 by, for example, welding, laser-beam welding, or shrink fitting.

Figure 15:
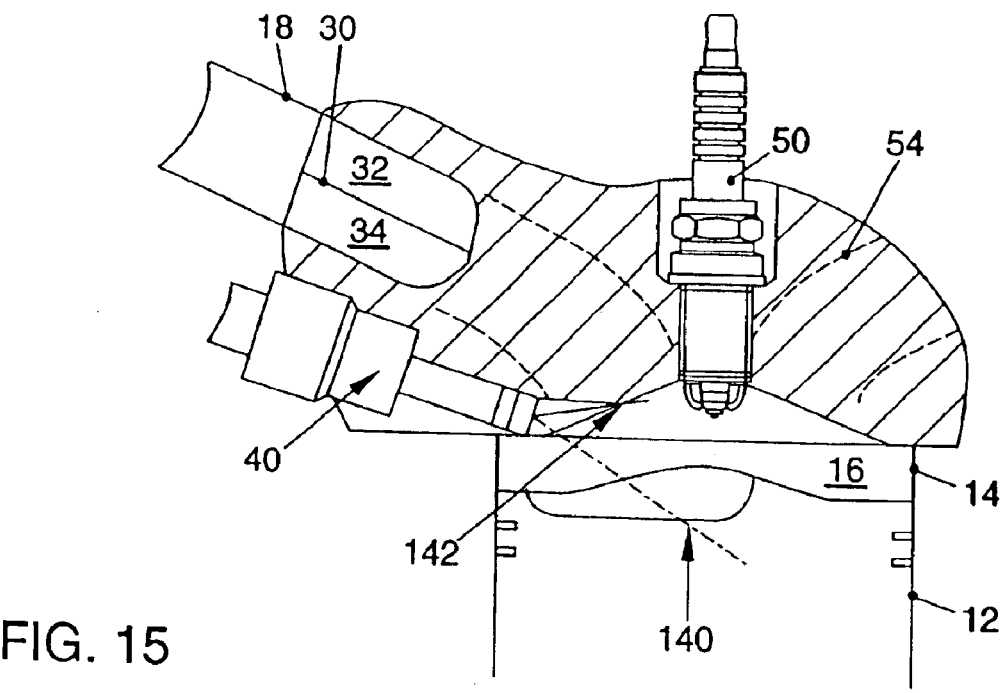
FIG. 15 shows a preferred embodiment of an injector with valve rinsing in a schematic sectional view.
Figure 16:
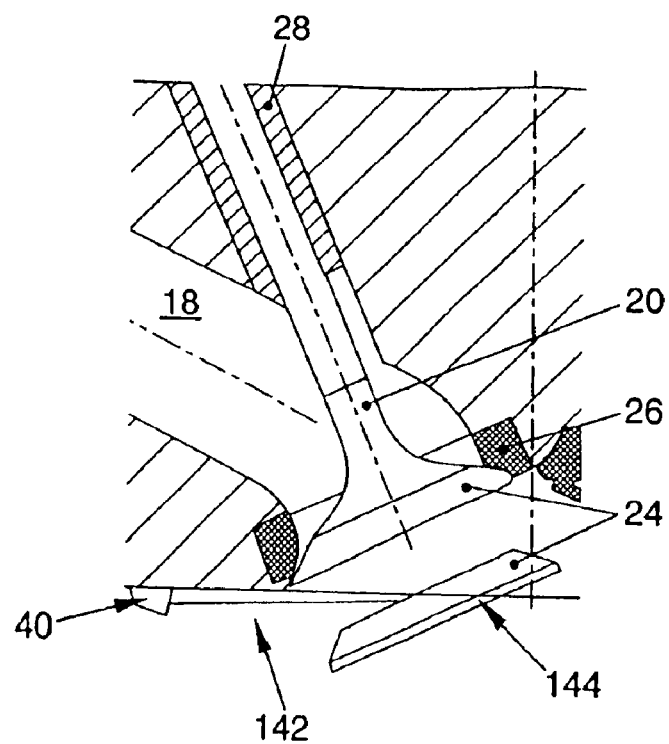
FIG. 16 shows a detailed view of the valve rinsing of FIG. 15 with the intake valve in the open and closed positions.

Another approach to the prevention of carbon deposits on the intake valves 20 that interfere with the operation of the internal combustion engine concerns a refinement of the injector 40, as is illustrated in FIGS. 15 and 16. The injector 40 injects a fuel jet 140 into the combustion chamber 16. In addition, the injector 40 is designed and arranged in such a way that, when the intake valve 20 is open (FIG. 16 ), a portion of the injected fuel hits the valve head 24 of the intake valve 20. To this end, the injector 40 has at least one additional opening and especially two additional openings, through which at least one additional fuel jet 142 is injected into the combustion chamber. This additional fuel jet 142 is directed in such a way that it hits the open intake valve 20, as shown in FIG. 16. In FIG. 16, the open intake valve 20 is indicated only by the valve head 24 at 144. The fuel on the valve head 24 cleans the valve head, and this prevents the buildup of carbon deposits on the intake valve to such an extent that the operational reliability and the operating behavior of the internal combustion engine are not impaired. In other words, rinsing of the valve head 24 and the neck 68 is realized. The additional fuel jet 142 is not necessarily injected into the working cylinders in each cycle of the cyclic stroke sequence, but rather only on a temporary basis.

Figures 17, 18:
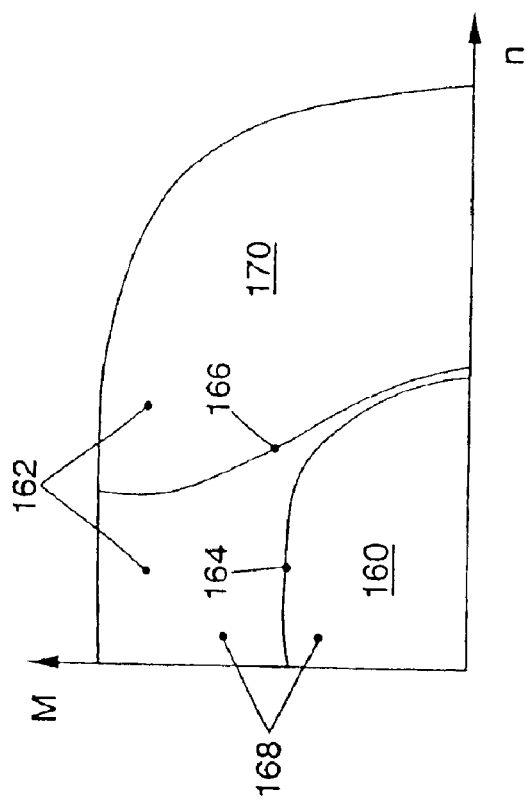
FIG. 17 shows tabulated test results.
FIG. 18 is a schematic representation of a load-speed characteristic diagram for an Otto engine with direct injection.

Another approach to removing carbon deposits concerns the charge movement butterfly valve 36. FIG. 18 shows a load-speed characteristic diagram with a region of stratified operation 160 and a region of homogeneous operation 162. A line 164 separates the region of stratified operation 160 from the region of homogeneous operation 162. In addition, a line 166 divides the load-speed characteristic diagram into a first region 168 and a second region 170. In the first region

168, the charge movement butterfly valve 36 is closed to ensure sufficient tumble flow, and in the second region 170 the charge movement butterfly valve 36 is open to ensure sufficient cylinder filling. In accordance with the invention, it is provided that, contrary to the specification of the load-speed characteristic diagram, the charge movement butterfly valve 36 be briefly closed, when the internal combustion engine is at an operating point in the second region 170. Surprisingly, during this period of closure, carbon deposits possibly present on the intake valves 20 are sufficiently removed, so that operationally related formation of carbon deposits on the intake valves 20 does not have a negative effect on the operational reliability and the operating behavior of the internal combustion engine.

For example, this is repeatedly carried out for brief periods of time during normal operation of the internal combustion engine, especially during the driving of a motor vehicle equipped with this internal combustion engine. In this regard, it was found that repeated closures for a period of 1 second to 10 seconds are sufficient. This short closure time makes it possible for vehicle occupants to be unaware of the consequences of this operation of the internal combustion engine, which is a deviation from the characteristic diagram. These consequences include, for example, reduced performance and uneven running of the internal combustion engine.

Alternatively or additionally, the closing of the charge movement butterfly valve 36 in the second region 170 is carried out during repair or maintenance work. In this case, the closure time is, for example, 15 min. to 60 min., and especially 30 min. For further support of the removal of carbon deposits on the intake valves, it was found to be advantageous simultaneously to adjust the ignition angle to late or early, to adjust the intake camshaft towards early, to adjust a high exhaust gas recirculation rate, to move the injection time towards late, and/or to set a lambda value of greater than 1. The above measures related to the charge movement butterfly valve and other operating parameters are, for example, incorporated in an engine control unit and are realized as a repair solution in customer service, for example, during inspection, or as routine measures during normal driving operation.

The following test was conducted to illustrate the effect of this method of cleaning carbon deposits from the intake valves 20: In an Otto engine with four cylinders and two intake valves 20 per cylinder, one new intake valve 20 and one intake valve 20 fouled with heavy carbon deposits were installed in each of cylinders 1 to 3. Two platinum-coated intake valves 20 with only light carbon deposits were installed in cylinder 4. All of the intake valves 20 were weighed after installation. The values that were determined are given in g in line 146 of the table in FIG. 17. The Otto engine was operated for 30 min. with the charge movement butterfly valve closed in the second region 170 of the load-speed characteristic diagram. The intake valves 20 were then reweighed. These weight values are given in g in line 148 of the table in FIG. 17. The results show clearly that the intake valves 20 that were fouled with carbon deposits lost a significant amount of weight, which means that the residues deposited on these intake valves were almost completely incinerated by the engine operation described above. This incineration can probably be attributed at least partly to increased temperatures of the intake valves to above 380° C. On the other hand, only a slight weight increase is observed for the intake valves that were installed new, which means that there is no significant buildup of carbon deposits during operation of the engine under the specified operating conditions. Line 150 of the table in FIG. 17 shows weights in g that were measured after a supplementary mechanical cleaning of the intake valves 20 that already had carbon deposits at the time of installation. It is apparent that the mechanical cleaning resulted in only insignificant weight losses, which means that only very small amounts of carbon deposits still remained on the intake valves 20 after the heating measure described above. The cleaning effect can be further enhanced by increasing the cooling water temperature during operation with the adjustments and settings specified above.

Another measure for counteracting carbon deposits on the intake valves 20 that could impair the operation of the internal combustion engine involves the opening of a butterfly valve installed in the intake port during thrust phases of a motor vehicle equipped with the direct-injection Otto engine. This avoids a potential pressure gradient between the combustion chamber and the intake port.

In the crankcase breather pipe 62 (FIG. 1), it is advantageous to separate oil contained in the blowby gases 60. Supplementary or intensified oil separation has a further positive effect on the aforementioned measures for counteracting carbon deposits on the intake valve, since smaller amounts of constituents that can potentially be deposited flow through the intake port 18 past the intake valve 20.

Another measure for removing carbon deposits involves the metering or injection of an agent that dissolves carbon deposits into the intake port during the running of the internal combustion engine to wet the corresponding intake valve 20 and dissolve carbon deposits. This injection can be performed with an additional injection device, for example, on a temporary basis during the normal operation of the internal combustion engine. During the operation of the internal combustion engine, this measure removes deposits on the intake valve to such an extent that an operationally related buildup of carbon deposits has no negative effect on the operational reliability and the operating behavior of the internal combustion engine. Alternatively or additionally, the invention provides for stationary operation of the internal combustion engine as part of repair or maintenance work, for example, for measuring or testing purposes, and at the same time, during this operation in the automotive workshop, carbon dissolvers are injected or metered into the intake port 18. In this way, any carbon deposits that may be present are regularly removed, so that they cannot become so extensive as to impair the operation of the internal combustion engine. The carbon-dissolving agent is metered or injected into the intake port, for example, via a flange for a partition plate.

It has also been found to be especially advantageous to reduce as much as possible contact between the intake valve and oil that does not contain a carbon-dissolving additive, for it has been found, surprisingly, that this prevents or at least greatly reduces the buildup of carbon deposits on the intake valves over a large part of the usual operating range of the internal combustion engine. To this end, the valve stem seal is designed in such a way that it has an oil penetrability of less than 0.003 g/h. A further advantageous reduction of the amount of oil that comes into contact with the intake valve is achieved by designing the particular piston ring packets of working pistons of the internal combustion engine in such a way that oil recirculated to the combustion chamber is recirculated in an amount of less than 3 g/h per working cylinder at rated speed, and/or by designing the oil separator of the crankcase breather pipe in such a way that it has an oil penetrability of less than 5 g/h.

Figure 19:
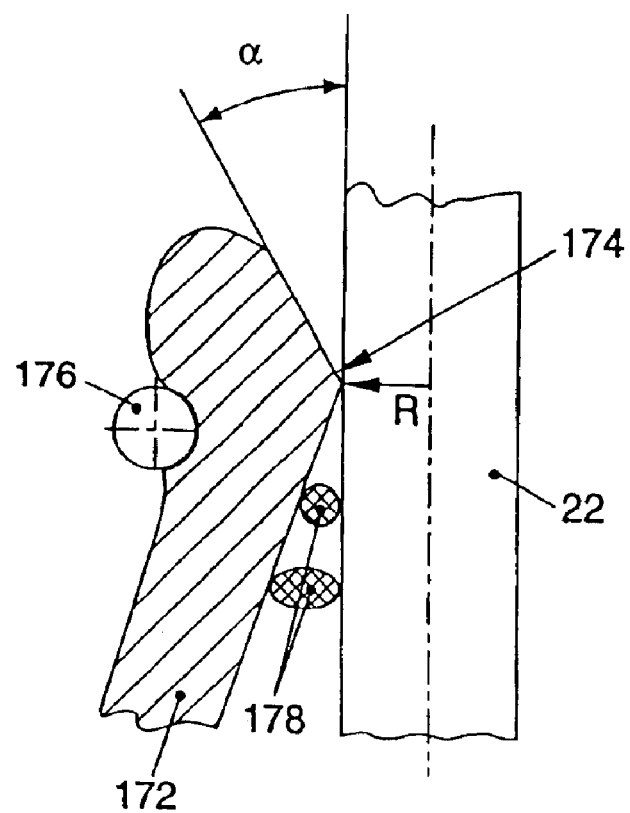
FIG. 19 shows a schematic sectional view of a preferred embodiment of a valve stem seal in accordance with the invention.

FIG. 19 shows an example of a preferred embodiment of a valve stem seal 172 of the invention for a valve stem 22 of an intake valve. This valve stem seal 172 comprises a sealing point 174 of radius R at the valve stem 22 and forms an angle α with the valve stem 22 on one side of the sealing point 174. In addition, the valve stem seal 172 acts together with a spring 176 and additional supports 178. The oil penetrability of the valve shaft seal 172 is adjusted by optimization of the parameters α, R, and the spring tension of the spring 176. A reduction of the tolerance-related scattering of the oil penetrability values is achieved by means of the additional supports 178, which are assigned in pairs to each valve stem seal 172.

What is claimed is:

1. An internal combustion engine, comprising: working cylinders having a combustion chamber; intake valves; and a fuel injector arranged to inject fuel directly into the combustion chamber of the working cylinders, the intake valves having a neck and a catalytic surface at least in a region of the neck so as to counteract formation of carbon deposits.

2. The internal combustion engine in accordance with claim 1, wherein the surface is microporous.

3. The internal combustion engine in accordance with claim 1, wherein the surface is antiadhesive.

4. The internal combustion engine in accordance with claim 3, wherein the antiadhesive surface consists of Cr—C—N.

5. The internal combustion engine in accordance with claim 4, wherein the Cr—C—N surface has a coating thickness of 5 μm.

6. The internal combustion engine in accordance with claim 1, wherein the surface is chemically inert towards predetermined elements.

7. The internal combustion engine in accordance with claim 6, wherein the surface is chemically inert towards at least one of the group consisting of C, H, O and N.

8. The internal combustion engine in accordance with claim 6, wherein the chemically inert surface consists of one of TiZr—C—H—N—O and TiAl—C—H—N—O.

9. The internal combustion engine in accordance with claim 8, wherein the chemically inert surface has a coating thickness of 5 μm.

10. The internal combustion engine in accordance with claim 1, wherein the catalytic surface consists of one of Pt and vanadium nitride (VN).

11. The internal combustion engine in accordance with claim 10, wherein the surface is microrough.

12. The internal combustion engine in accordance with claim 1, wherein the surface is oxidized and consists of vanadium pentoxide ($V_2O_5$).

* * * * *